Patented Mar. 16, 1937

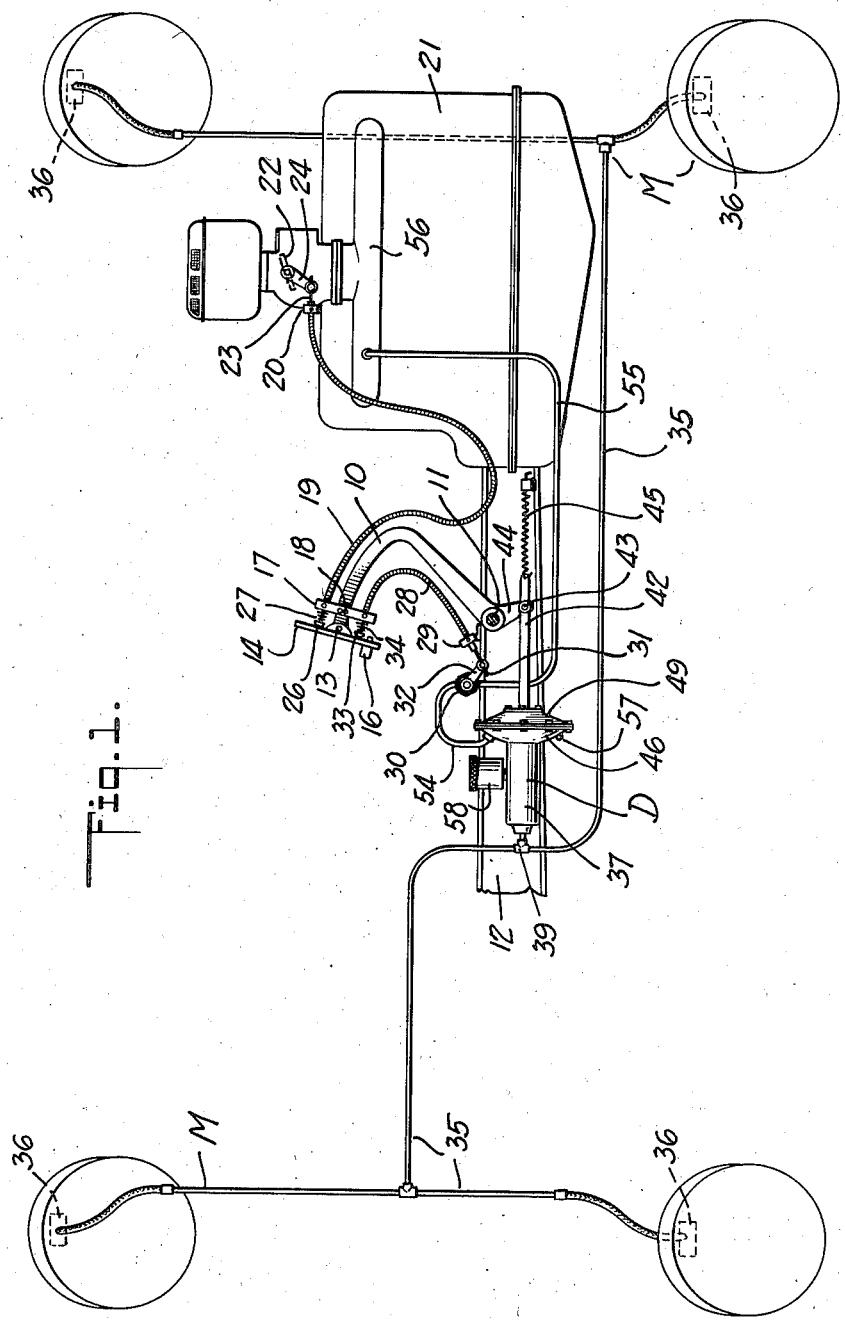

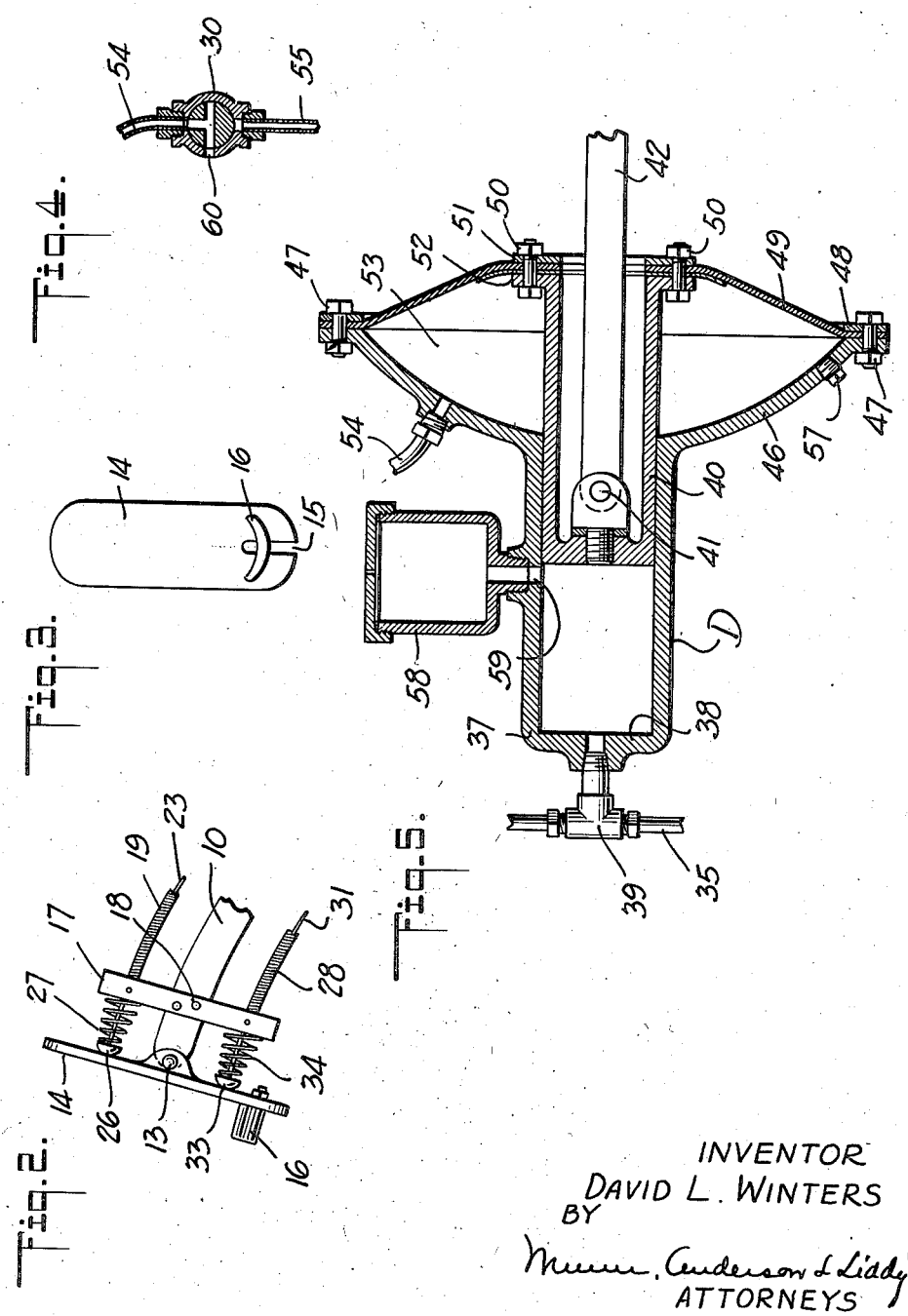

2,073,772

UNITED STATES PATENT OFFICE 2,073,772

SPEED CONTROL SYSTEM FOR VEHICLES

David L. Winters, Los Angeles, Calif.

Application September 26, 1936, Serial No. 102,755

14 Claims. (Cl. 192—3)

This invention relates generally to speed control systems, and more particularly to systems for use with high speed vehicles, such as automobiles.

An object of this invention is to provide a speed control system for vehicles which in its application to an automobile insures a greatly simplified and safer method of controlling the speed of the vehicle by enabling the control of a foot brake, power brake, and accelerator to be obtained from a single location of the foot of the operator, and without such lost motion in the system as would cause loss of time in manipulating the controls to perform the various operations.

Another object of the invention is to provide a speed control system for vehicles which enables a foot brake and a power brake to be simultaneously actuated for emergency stops; which enables concurrent actuation of the foot brake and accelerator to be effected in a manner to safely hold and start the vehicle on an upgrade; and which positively prevents concurrent actuation of the power brake and accelerator at all times to insure that when the vacuum from engine suction is used as a source of power, maximum power from such source will be available whenever power braking is effected.

A further object of the invention is to provide a speed control system of the above described character by which a high speed safety brake incapable of locking the wheels is obtained, and is conveniently operable for service applications, all the while enabling the braking energy of the foot brake to be instantly added to that of the power brake in an emergency.

With these and other objects in view, the invention consists in the following combinations, arrangements and functional relationships of elements as set forth in the following specification and particularly pointed out in the appended claims.

In the drawings,

Figure 1 is a semi-diagrammatic view illustrating the speed control system embodying this invention applied to the engine and braking mechanisms of the vehicle;

Figure 2 is a fragmentary view in side elevation of the foot pedal embodied in the braking lever of the invention;

Figure 3 is a front view of the foot pedal;

Figure 4 is a detail sectional view of a fluid control valve embodied in the invention;

Figure 5 is a longitudinal sectional view of the fluid displacement device shown in Figure 1;

Referring specifically to the drawings, and in carrying the invention into practice, a foot operated member in the form of a brake lever 10 is mounted on a fixed pivot 11 on the automobile chassis 12. On the upper end of the lever is pivotally mounted intermediate its ends at 13, a foot controlled actuator in the form of a pedal 14, for rocking motion in a vertical plane parallel to the length of the vehicle. The lower or rear end of the pedal is bifurcated at 15 to receive an adjustable heel rest 16, as shown in Figure 3.

Immediately below the pivotal mounting of the pedal on the brake lever is a support in the form of a cross-bar 17 rigidly secured at 18 to the lever and projecting from opposite sides thereof in parallelism with the length of the pedal. Secured at one end to the cross-bar 17 is a flexible conduit 19, the other end of which is anchored at 20 to the block of the vehicle's engine 21 adjacent the throttle valve 22 of the engine. A flexible control wire 23 extends through the conduit 19, with the lower end of the wire secured to the operating arm 24 of the throttle valve 22 and the upper end extending through an opening in the cross-bar 17 and provided with a head 26. A coil spring 27 surrounding the wire 23 between the head 26 and the cross-bar urges the wire in a direction to maintain the throttle valve closed and the head 26 in engagement with the underside of the toe portion of the pedal 14 so that forward tilting movement of the foot will open the throttle valve.

Secured at one end to the cross-bar 17 at the opposite and rear side of the lever 10, is one end of a second flexible conduit 28 the other end of which is anchored at 29 on the chassis adjacent a control instrumentality in the form of a valve 30 which may be of the conventional rotary type. A flexible control wire 31 extends through the conduit 28 and is connected at its lower end to the operating arm 32 of the valve 30. The upper end of the wire 31 extends through the crossbar 17 and is provided with a head 33 normally urged to engage the underside of the pedal 14 at the heel portion thereof by a coil spring 34 surrounding the wire and interposed between the head 33 and the cross bar 17.

The valve 30 is adapted to control the application of a vacuumatic force from the engine to a fluid displacement device D adapted to form part of the hydraulic braking mechanism M of the vehicle so as to simulate the master cylinder of the mechanism from which the usual tubes 35 lead to the wheel cylinders 36, as will be understood by those familiar with the art.

The fluid displacement device D is a combined power and manually operated means and comprises a cylinder 37 to the closed end 38 of which is connected the tubes 35 through a suitable T-fitting 39. In the other and open end of the cylinder 37 works a cup-shaped piston 40, the inner end of which is closed and has pivoted thereto at 41 one end of a link 42. The other end of the link has a pivotal connection 43 with an extension 44 of the foot brake lever 10, such that depressing the pedal 14 to rock the lever downwardly about its fixed pivot 11 will advance the piston 40 into the cylinder 37 to exert pressure upon and displace liquid in the cylinder so as to apply the brakes. The application of the brakes manually in such manner is primarily for emergency uses and for holding the vehicle on a grade.

A heavy spring 45 is anchored on the vehicle and connected to the link 42 so as to normally retract the piston 40 and to maintain the foot lever 10 in its elevated position shown in Figure 1, with sufficient force to provide a firm support for the foot of the operator, when resting upon the pedal 14, whereby to permit the normal operation of the vehicle in alternatively controlling the supply of fuel to the engine or controlling a power brake, by rocking the pedal about its axis 13 on the lever 10 without depressing the latter.

The open end of the cylinder 37 is enlarged by a concavo-convex flange 46 to which is secured by bolts 47 and a metal ring 48 the outer edge portion of a flexible diaphragm 49 of leather, rubber or other suitable material. The diaphragm is provided with a central opening receiving the link 42, and is secured by bolts 50 and a ring 51 to a flange 52 projecting radially from the outer open end of the piston so that the diaphragm co-acts with the cylinder flange 46 in defining a chamber 53 which through the medium of a pipe 54 is connected to the body of the control valve 30. At a diametrically opposite point the valve body is connected by a suction pipe 55 to the intake manifold 56 of the engine so that when the latter is in operation and the valve 30 is opened by rocking the pedal 14 rearwardly about its axis 13 on the lever 10, the suction of the engine will induce a partial vacuum in the chamber 53 to act upon the diaphragm 49 and advance the piston 40 in the cylinder 37, whereby to apply the brakes by power. A removable plug 57 is provided in the flange 46 to enable any liquid which might leak past the piston 40 to be drained from the chamber 53. A liquid reservoir 58 is provided on the cylinder 37 and communicates with the bore of the latter through a port 59 so as to automatically replace any fluid lost from the fluid lines.

The operation of the invention is as follows:

With the parts occupying their respective positions shown in Figure 1, it will be clear that with the foot resting upon the pedal 14, tilting the pedal forwardly about the axis 13 by the toe portion of the foot will open the throttle valve 22 so as to supply fuel to the engine 21, thus providing for the function of the usual separate accelerator pedal now universally used on automobiles.

By tilting the pedal 14 rearwardly about the axis 13 by the heel portion of the foot will actuate the valve 30 from its normal position wherein the manifold 56 is disconnected from the chamber 53 and the latter is vented to atmosphere by the valve, through a port 60 (Figure 4), to a position wherein the atmospheric vent is closed and the chamber is placed in communication with the intake manifold. Thus, with the engine in operation the suction induced thereby will, by the resulting partial vacuum in the chamber 53, act upon the diaphragm 49 to advance the piston 40 in the cylinder 37 and thus displace liquid therein to apply the brakes.

As the engine suction is constant when the throttle is closed, the size of the diaphragm is calculated accordingly to act only with sufficient force upon the piston 40 for a service application of the brakes incapable of locking the wheels on dry pavement. By the relationship of the control wires 23 and 31 to the pedal 14, the throttle valve 22 and control valve 30 can only be alternatively operated so as to prevent a power application of the brakes concurrently with the supply of fuel to the engine, with the attendant drop in suction and unnecessary wear on the brakes.

When an emergency application of the brakes is to be effected in addition to the service application normally provided by vacuumatic power, it is only necessary for the operator to increase the pressure on the pedal 14. Thus, in an emergency, both forms of braking methods are utilized additively without any lost motion.

Furthermore, with the pedal 14 occupying the neutral position shown in Figure 1, the lever 10 can be depressed to manually apply the brake for holding the vehicle on a grade, and can be permitted to release the brake concurrently with forward tilting of the pedal 14 to supply fuel to the engine in order to facilitate starting the vehicle on an upgrade, which, in automobiles as at present constructed, is a maneuver requiring expertness on the part of the operator to prevent stalling the engine and/or slipping down the grade. It will be appreciated that the lever 10 can rock about its fixed pivot 11 to manually apply the brakes without transmitting any motion to the control wires 23 and 31, as the respective conduits 19 and 28 merely bend about their anchorages 20 and 29 during such motion of the lever, which is, therefore, independently operable.

It will be appreciated that the invention eliminates the unavoidable loss of valuable time in transferring the foot from a separate accelerator pedal to a brake pedal in an emergency, which maneuver requires approximately one second. It is, of course, a fact that the loss of a second in applying the brake at thirty-five miles per hour increases the stopping distance fifty-one feet four inches, which distance is responsible for a large proportion of fatalities and a much larger proportion of lesser injuries as well as property damage.

The invention, therefore, provides for a much safer speed control of the vehicle, as well as greatly simplifies the present control mechanism by enabling the control of the fuel and the power service brake to be alternatively effected from one location, and the manually operable foot brake instantly added to the power brake in an emergency and without lost motion, or used in conjunction with the control of fuel in holding and/or starting the vehicle on a grade, all from one and the same location of the foot.

It will be appreciated that the invention, as above structurally characterized, enables an emergency brake application to be manually effected instinctively by leg pressure imposed on the pedal 14 and tending to depress the lever 10 farther than it has been moved incident to a power application of the brakes when maintained effective by the operator holding the pedal in its rearwardly tilted position on the lever as the leg pressure is transmitted through the pedal to the lever.

It will be manifest that as the lever 10 is automatically depressed upon a power brake application, all slack or lost motion between the lever and piston 40 is taken up because the lever is directly connected mechanically thereto by the lever extension 44 and link 42, so that for all practical purposes only instinctive downward leg pressure is necessary in an emergency to instantaneously add the manual braking energy to the power braking energy to lock the wheels.

It is to be noted that the conduits 19 and 28 and the respective control wires 23 and 31 therein constitute flexible operative connections, and that for the control wires, liquid columns and terminal pistons in the conduits (not shown) could be substituted to function in the same manner as the control wires and provide merely another form of flexible operative connection enabling independent movement of the lever 10 to be effected.

What is claimed is:

1. In a vehicle, an engine for propelling the vehicle; power braking mechanism for the vehicle; foot actuated means operatively associated with the engine throttle and braking mechanism, by which same can be alternatively operated from a single location of the foot to either supply fuel to the engine or effect a power brake application; and means operatively associated with the first means and braking mechanism by which the latter can be actuated to effect a manual brake application by movement of the first means bodily by the foot from the aforestated location thereof.

2. In a vehicle, an engine for propelling the vehicle; power braking mechanism for the vehicle; foot actuated means operatively associated with the engine throttle and braking mechanism, by which same can be alternatively operated from a single location of the foot to either supply fuel to the engine or effect a power brake application; means operatively associated with the first means and braking mechanism by which the latter can be actuated to effect a manual brake application by movement of the first means bodily by the foot from the aforestated location thereof; and means by which the first means is rendered bodily movable without effecting operation of the throttle and braking mechanism, so that either can be combined with a manual brake application or the latter used alone.

3. In a speed control system for automotive vehicles, power braking mechanism; a foot operated member; means including a foot controlled actuator movably mounted on said member by which the engine throttle can be operated and a power brake application by said braking mechanism effected alternatively; and means by which manual movement of said member will actuate the braking mechanism to effect a manual brake application.

4. In a speed control system for automotive vehicles, power braking mechanism; a foot operated member; means including a foot controlled actuator movably mounted on said member by which the engine throttle can be operated and a power brake application by said braking mechanism effected alternatively; and means including an operative connection between said member and braking mechanism for actuating the latter to effect a manual brake application in response to movement of said member, and additively to the power braking when maintained in effect by the actuator.

5. In a speed control system for automotive vehicles having power braking mechanism, a foot lever; a foot controlled actuator tiltably mounted on the lever; means by which tilting of the actuator in one direction from a neutral position will effect operation of the engine throttle; means by which tilting of the actuator in the opposite direction from the neutral position will effect a power brake application by the braking mechanism; and means by which movement of the lever manually will effect a manual application of the brakes by the braking mechanism.

6. In a speed control system for automotive vehicles having power braking mechanism; a foot lever; a foot controlled actuator tiltably mounted on the lever; means by which tilting of the actuator in one direction from a neutral position will effect operation of the engine throttle; means by which tilting of the actuator in the opposite direction from the neutral position will effect a power brake application by the braking mechanism; and means including an operative connection between said lever and braking mechanism by which movement of the lever manually will effect a manual application of the brakes by the braking mechanism with or without either a throttle operation or a power brake application according as the actuator is maintained tilted in one or the other direction or occupies neutral position.

7. In a speed control system for automotive vehicles having power braking mechanism, a foot lever; a foot controlled actuator tiltably mounted on the lever; means by which tilting of the actuator in one direction from a neutral position will effect operation of the engine throttle; means by which tilting of the actuator in the opposite direction from the neutral positon will effect a power brake application by the braking mechanism; means by which movement of the lever manually will effect a manual application of the brakes by the braking mechanism; and means whereby said lever is rendered movable for a manual application of the brakes without affecting the operation of the first and second means so that either the throttle operation or the power brake application can be combined with the manual brake application or the latter used alone.

8. In a speed control system for vehicles having an engine and a power braking mechanism, a foot operated member having a movably mounted foot controlled actuator thereon; means responsive to one movement of the actuator to open the engine throttle; means responsive to another movement of the actuator to supply power to the braking mechanism and effect a power application of the brakes; and means responsive to movement of said member to actuate the braking mechanism and effect a manual application of the brakes.

9. In a speed control system for vehicles having an engine and a power braking mechanism, a foot operated member having a movably mounted foot controlled actuator thereon; means responsive to one movement of the actuator to open the engine throttle; means responsive to another movement of the actuator to supply power to the braking mechanism and effect a power application of the brakes; means responsive to movement of said member to actuate the braking mechanism and effect a manual application of the brakes; means for retaining the actuator in a neutral position on said member; and means for yieldingly sustaining said member in a brake releasing position with sufficient force to support the foot on the actuator for its aforestated movements independently of movement of said member.

10. In a speed control system for vehicles having an engine and a power braking mechanism; a foot operated member having a movably mounted foot controlled actuator thereon; means responsive to one movement of the actuator to open the engine throttle; means responsive to another movement of the actuator to supply power to the braking mechanism and effect a power application of the brakes; and means operatively connecting the braking mechanism to said member by which movement of the latter manually will actuate the braking mechanism to apply the brakes manually and in addition to the power braking when maintained in effect by the actuator.

11. In a vehicle, an engine for propelling the vehicle; a braking mechanism for the vehicle; a source of power for the braking mechanism including a control instrumentality therefor; foot actuated means operatively associated with the engine throttle and with said instrumentality for alternatively operating same by a tilting motion of the foot in one direction or the other to either supply fuel to the engine or effect a power application of the brakes; movable means on which the first means is mounted; and means operatively connecting the movable means with the braking mechanism, by which bodily movement of the first means by the foot to actuate said movable means will effect a manual application of the brakes.

12. In a speed control system for vehicles having an engine and a braking mechanism; a manually operable member having a foot-controlled actuator mounted thereon for movements independently of the member, and by which the member can be manually moved; a source of power for the braking mechanism; means responsive to one movement of the actuator to open the engine throttle; means responsive to another movement of the actuator to supply power from said source to the braking mechanism and effect a power application of the brakes; and means by which manual movement of the member in response to movement of said actuator bodily will actuate the braking mechanism to manually apply the brakes.

13. In a speed control system for vehicles having an engine and a braking mechanism, a manually operable member having a foot-controlled actuator mounted thereon for movements independently of the member, and by which the member can be manually moved; a source of power for the braking mechanism; means responsive to one movement of the actuator to open the engine throttle; means responsive to another movement of the actuator to supply power from said source to the braking mechanism and effect a power application of the brakes; means by which manual movement of the member in response to movement of said actuator bodily will actuate the braking mechanism to manually apply the brakes; means for retaining said actuator in a neutral position; and means for yieldingly sustaining said member in a brake releasing position with sufficient force to support the foot of the operator on said actuator for said independent movements thereof without moving the said member manually.

14. In an automotive vehicle having a power braking mechanism, means for manually controlling the engine throttle of the vehicle by an operator's foot from one location thereof; means for manually controlling power braking of the vehicle by the operator's foot from the aforestated location thereof; means for actuating the braking system manually by movement of the operator's foot bodily from the aforestated location thereof; and means by which manual braking can be effected in conjunction with either the throttle control or power brake control, or used alone.

DAVID L. WINTERS.